A. BOURGEOIS.
RESILIENT WHEEL.
APPLICATION FILED AUG. 31, 1914.

1,120,896.

Patented Dec. 15, 1914.

A. Bourgeois

Witnesses

Inventor by

Attorneys

UNITED STATES PATENT OFFICE.

ALBERT BOURGEOIS, OF LAFOURCHE CROSSING, LOUISIANA.

RESILIENT WHEEL.

1,120,896.  Specification of Letters Patent.  Patented Dec. 15, 1914.

Application filed August 31, 1914. Serial No. 859,466.

*To all whom it may concern:*

Be it known that I, ALBERT BOURGEOIS, a citizen of the United States, residing at Lafourche Crossing, in the parish of Lafourche and State of Louisiana, have invented a new and useful Resilient Wheel, of which the following is a specification.

The present invention appertains to resilient wheels, and aims to provide a novel and improved vehicle wheel eliminating the use of a pneumatic tire, and whereby the wheel will possess the desirable qualities of a wheel having a pneumatic tire, but at the same time, which will eliminate the objectionable features of a pneumatic tire.

The present invention contemplates the provision of a resilient vehicle wheel embodying a unique assemblage of component parts, whereby the wheel will permit of vertical relief when it encounters obstructions, and whereby the wheel will otherwise effectively serve its intended functions.

It is also within the scope of the present invention to provide a resilient wheel of comparatively simple, durable and inexpensive construction, and which will be practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention has been illustrated in its preferred embodiment in the accompanying drawing, wherein:—

Figure 1:
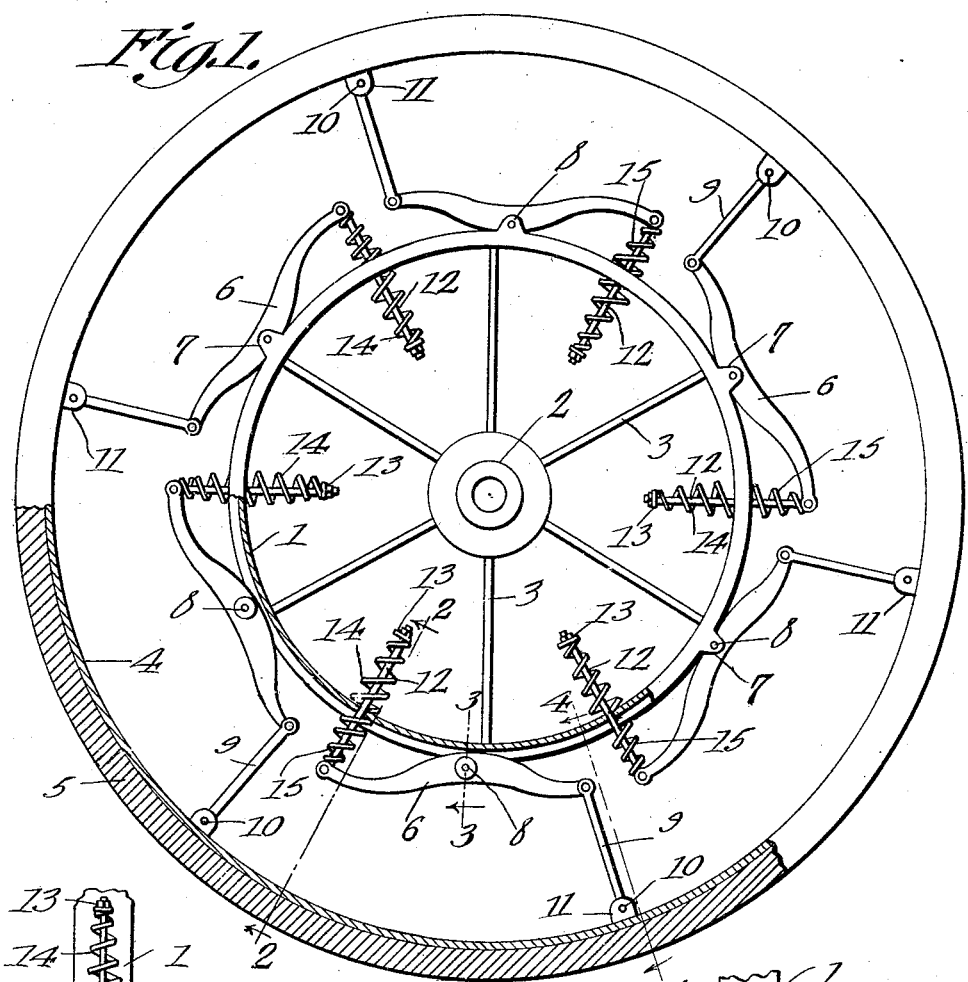
Figure 2:
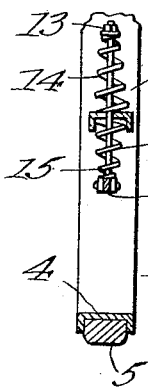
Figure 3:
Figure 4:
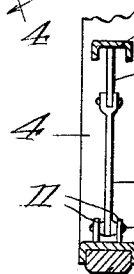

Figure 1 is a side elevation of the improved resilient wheel, portions being broken away. Figs. 2, 3 and 4 are sectional detail views taken on the line 2—2, 3—3 and 4—4 of Fig. 1, respectively.

In carrying out the present invention, there is provided an inner felly or annulus 1 which is rigidly connected to the hub 2 by the spokes 3. An outer rim 4 surrounds the felly or annulus 1 and is spaced suitably therefrom, and a rubber or other suitable tire 5 may be mounted upon the outer rim 4, if desired.

The felly or annulus 1 and rim 4 are flexibly and resiliently connected, to enable the said parts to move or vibrate relative to one another in the plane of the wheel, and to this end a plurality or series of levers 6 are fulcrumed intermediate their ends between pairs of ears 7 projecting outwardly from the edge portions of the felly or annulus 1 adjacent the outer ends of the spokes 3. The intermediate portions of the levers 6 are disposed between the ears 7, and rivets or pins 8 are engaged through the ears 7 and the levers 6 to fulcrum the levers to the felly or annulus 1. A link 9 is pivotally connected to one end of each lever 6 and the outer end of the link 9 is pivotally connected to a pin or rivet 10 which is engaged through a pair of ears 11 projecting inwardly from the rim 4. Thus, the levers 6 are linked to the rim 4, which will permit the rim 4 and annulus 1 to have relative rotary movements as well as movements to and from each other.

Rods or plungers 12 are pivotally connected to the other arms of the levers 6, and are engaged slidably through the felly or annulus 1 between the spokes 3, retaining nuts or elements 13 being threaded or otherwise engaged upon the inner ends of the rods or plungers 12, and coiled wire expansion springs 14 being disposed upon the rods 12 between the nuts or elements 13 and the felly or annulus 1, while similar springs 15 are disposed upon the rods 12 between the felly or annulus 1 and the corresponding ends of the levers 6. The respective springs 14 and 15 are therefore in opposition, to balance one another, so that they will have a tendency to normally hold the felly or annulus 1 and ring 4 concentric.

In practice, the movement of the rim 4 relative to the annulus 1, will cause the levers 6 to vibrate, against the tension of the respective springs 14 and 15, whereby the springs will yieldably resist the strains to which the wheel is subjected, and will absorb the shocks and concussions to which the wheel is subjected in use. As a result, the wheel will be sufficiently resilient to afford of easy riding without the employment of the usual pneumatic tire, the disadvantages and objections of which are well known.

Having thus described the invention, what is claimed as new is:—

1. In a resilient wheel, an inner annulus, an outer rim, a hub attached rigidly to the annulus, levers fulcrumed to the annulus, a link connecting one arm of each lever and the rim, a rod pivotally connected to the other arm of each lever and slidable through the annulus, retaining elements engaged upon the inner ends of the rods, coiled wire expansion springs disposed upon the rods between the retaining elements and annulus, and coiled wire expansion springs disposed upon the said rods between the annulus and levers.

2. In a resilient wheel, an inner felly, an outer rim, a hub, spokes rigidly connecting the hub and felly, the felly having outwardly projecting ears adjacent the spokes, levers fulcrumed to the said ears intermediate their ends, a link pivotally connected to one arm of each lever, the rim having inwardly projecting ears to which the said links are pivoted, a rod pivotally connected to the other arm of each lever and slidable through the felly, said rods being disposed between the spokes, retaining elements engaged upon the inner ends of the rods, and springs disposed upon the rods and bearing against the felly.

In testimony that I claim the foregoing as my own, I have hereto affixed my signature in the presence of two witnesses.

ALBERT BOURGEOIS.

Witnesses:
 CHARLEY BRAND,
 E. THIBODEAUX.